Jan. 4, 1944.   F. G. LOGAN   2,338,250
ELECTRIC CONTROLLING APPARATUS
Filed July 14, 1941   3 Sheets-Sheet 1
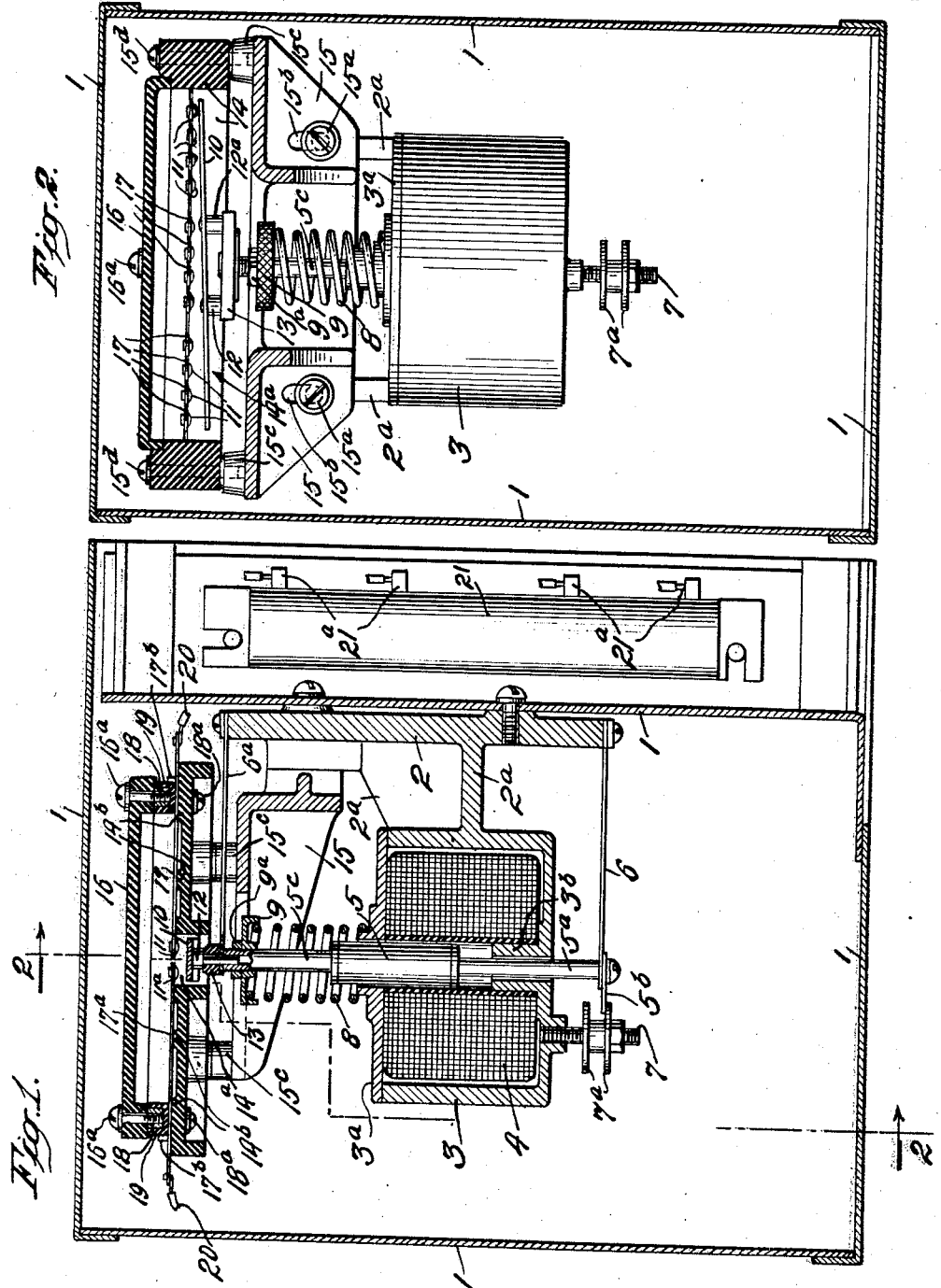
INVENTOR
FRANK G. LOGAN
BY
Lawrence K. Sager
his ATTORNEY

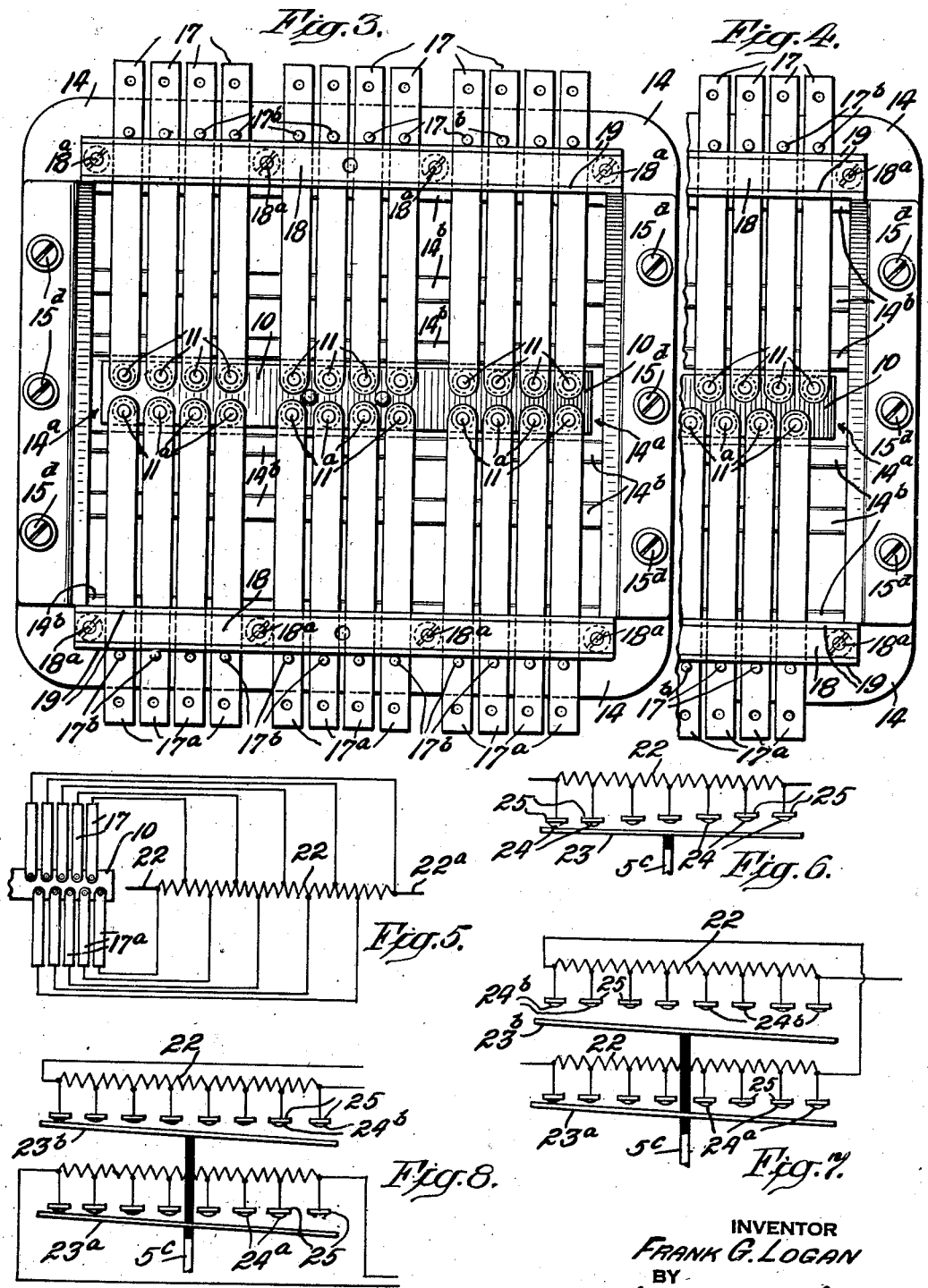

Jan. 4, 1944.                F. G. LOGAN                2,338,250
                     ELECTRIC CONTROLLING APPARATUS
                          Filed July 14, 1941              3 Sheets-Sheet 3
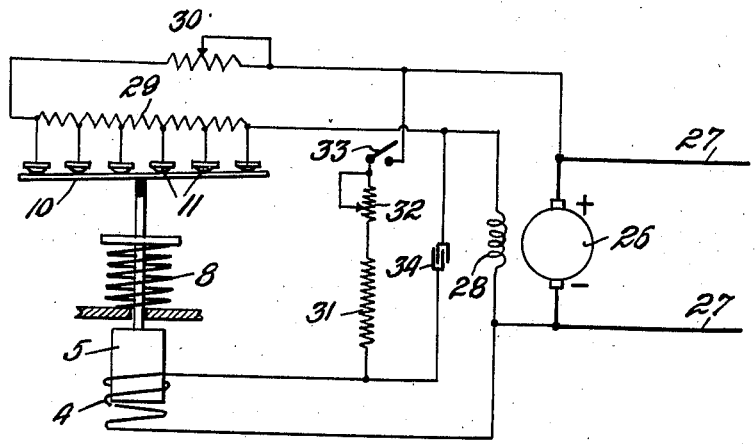
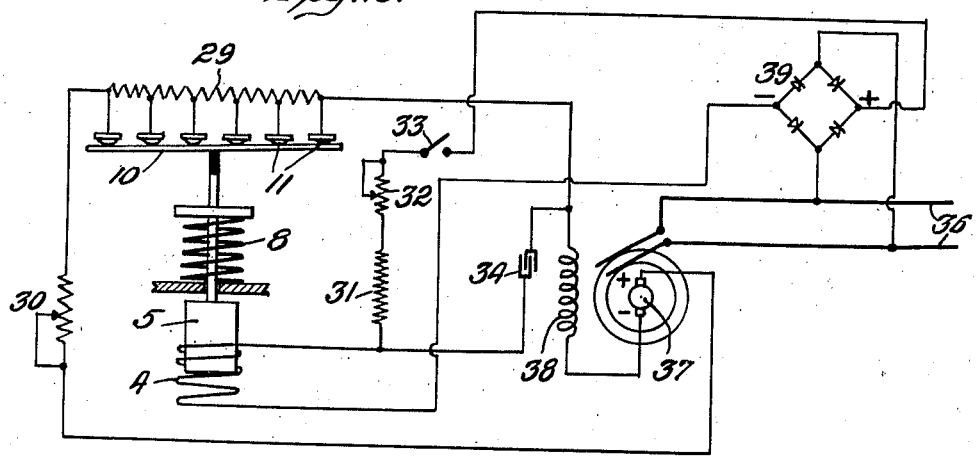
INVENTOR
FRANK G. LOGAN
BY
Lawrence K. Sager
his ATTORNEY Patented Jan. 4, 1944

2,338,250

UNITED STATES PATENT OFFICE 2,338,250

ELECTRIC CONTROLLING APPARATUS

Frank G. Logan, Mount Vernon, N. Y., assignor to Ward Leonard Electric Company, a corporation of New York Application July 14, 1941, Serial No. 402,311

6 Claims. (Cl. 200—104)

This invention relates to improvements in rheostats for application to various purposes. There is disclosed herein an application to regulators for maintaining constant the output of a dynamo-electric machine, such as the voltage of a generator, by variably controlling the field of the generator. The improved regulator with means for preventing hunting of the controlling apparatus is disclosed and claimed in a divisional application Serial No. 422,834, filed December 13, 1941.

One object of this invention is to provide an improved method and form of apparatus for varying the resistance in a circuit. Another object is to provide a form of structure for varying the resistance which will be sensitive to small changes of the controlling current and whereby the amount of resistance in circuit may closely correspond to the value of the controlling current imposed upon the resistance controlling apparatus. Another object is to provide apparatus which will apply a pronounced corrective factor quickly in variable amounts according to the requirements to overcome any change of conditions and to accomplish this by comparatively small movement of the parts. Further objects are to provide a simple, rugged and compact form of structure which will be dependable in operation during long continued use. Other objects and advantages of the invention will be understood from the following description and accompanying drawings showing preferred embodiments of the invention.

Fig. 1 is a vertical section of the rheostat showing the adjusting means thereof; Fig. 2 is a section on the line 2—2 of Fig. 1; Fig. 3 is a plan view of the terminal board assembly of the rheostat of Figs. 1 and 2 with the top cover removed; Fig. 4 is a plan view of a portion of a modified form of terminal board; Fig. 5 is a diagram of connections of the rheostat; Fig. 6 is a diagram showing a modified form of contact relationship; Figs. 7 and 8 are diagrams showing modified forms of the invention; Fig. 9 is a diagram showing one embodiment of the improved regulator for controlling a self-excited direct current generator; and Fig. 10 is a diagram of the improved regulator applied to a self-excited alternating current generator.

Referring to Figs. 1 and 2, a casing 1 encloses the variable resistance device and controlling means. The apparatus is supported on the back plate of the casing by a frame in the form of a casting 2 of iron having webs 2a which extend forwardly and carry the cylindrical and bottom portion of a magnet frame 3 integral with the frame support and having a removable top cover 3a. The bottom plate of the magnet frame is provided with a central upwardly extending plug 3b having a central opening. The controlling coil or winding 4 is housed within the magnet frame. The cylindrical plunger 5 of the magnet passes freely through the cover 3a of the magnet and in the fully attracted position shown, the plunger is well within the coil. A metal rod 5a of smaller diameter than the plunger is secured thereto at its lower end and extends freely through the central opening of the plug 3b. One end of a leaf spring 6 is secured to the lower end of the rod 5a and the other end of the spring is attached to and supported by a lower extension from the casting 2. This spring is a guiding spring for the plunger and imposes only a minimum resultant force on the plunger 5. A threaded rod 7 is secured to the front portion of the bottom of the magnet frame and carries an adjustable nut provided with spaced collars 7a. An extension 5b is secured to the lower end of the rod 5a and enters the space between the collars 7a. These collars serve to limit the upper and lower positions of the plunger. From the upper end of the plunger extends another rod 5c. One end of another guiding leaf spring 6a is secured to the upper end of this rod, the opposite end of the spring being fixed to the frame 2. The springs 6 and 6a position and suspend the plunger 5 so that they serve as the sole guide and maintain the moving parts free from contact with other fixed parts.

When current is passed through the winding of the magnet, it exerts a downward pull on the plunger and such pull is opposed by a compression spring 8 which surrounds the rod 5c and the upper portion of the plunger. The lower end of the spring seats against the cover of the magnet frame and its upper end engages the interior of a cup-shaped plate 9 which is threaded on the upper end of the rod 5c and locked in any adjusted position by the lock-nut 9a. Adjustment of this plate evidently determines the force exerted by the spring for insuring proper controlling effect.

The main movable contact element of the rheostat and circuit controlling element of the regulator is carried by the upper end of the rod 5c. It is in the form of a contact bar or plate 10 and is positioned below a series of movable contacts 11 and 11a. The contact plate extends crosswise to its supporting rod, as shown in Fig. 2, and is inclined slightly to a horizontal line.

The resistive elements are connected between the contacts 11 and 11a in a manner later explained. In the particular form shown, the contact bar 10 is out of engagement with any of the movable contacts 11 and 11a, except possibly the right-hand contact of Fig. 2, and the bar assumes this position, in this particular embodiment, when the plunger is attracted by the magnet to its lowest limiting position. Upon a decrease of current in the magnet coil, the spring 8 will move the contact bar upwardly to a greater or lesser amount depending upon the current value; and when the current is sufficiently decreased, the spring will move the contact bar to its upper limiting position.

This range of movement is quite small; and the inclination of the bar is such that in its upward movement it will successively engage the contacts 11 and 11a until, at its uppermost position it engages all of them and then short-circuits all of the resistive elements connected between the contacts. The contacts 11 and 11a are movably supported in a manner later explained and during the upward movement of the bar, they are successively raised as engaged and lifted by the bar. The structure is such that the weight and pressure of the contacts upon the bar is slight which permits the control to be sensitive to small changes in value of the current imposed upon the magnet coil. And the plunger and contact bar will assume a floating position dependent upon the value of the controlling current and thereby insert and maintain a proper amount of resistance in its circuit for a given value of magnet coil current. Upon any change of current, the contact bar will assume a position corresponding thereto and modify the resistance of the controlled circuit accordingly. Furthermore, the plunger and contact bar will move quickly in response to any change of controlling current; and by reason of the fact that a comparatively small movement will make a considerable change in the number of contacts engaged by the bar, the change of resistance in the controlled circuit may be very pronounced and rapid. The structure is therefore well adapted for use in regulators and other control apparatus.

Referring further to Figs. 1 and 2, the bar or plate 10 is shown supported by two studs 12 and 12a of slightly different heights for giving proper inclination to the contact bar. These studs are part of a cross piece 13 of insulating material which is fixed to the upper end of the rod 5c.

The rheostat terminal board, comprising the yieldable contacts 11 and 11a, is carried by a block 14 of molded insulating material. It is supported by a metal bracket 15 of web form having a rear portion by which it is fixed by screws 15a to an upper rear portion of the main frame 2. The screws 15a pass through vertical slots 15b in rear portions of the bracket for obtaining vertical adjustment of the bracket and terminal board for securing the proper position of the contacts 11 and 11a above the contact bar. At the two opposite sides of the bracket 15 are upwardly extending studs 15c for receiving screws 15d which secure the terminal board support 14 to the bracket. The terminal board support or frame has a central opening 14a for receiving the contact bar, the contacts 11 and 11a overhanging this opening. A cover 16 of insulating material encloses the terminal board at the top being connected thereto by screws 16a.

The contacts 11 and 11a are respectively carried by the inner ends of metal strips 17 and 17a in opposing sets which rest flatwise on crosswise ridges 14b formed on the top surface of the support 14. These narrow ridges position the contact strips above the top surface of the support 14 and thereby avoid any tendency to adhere thereto and permit them to be raised easily. The two inner ridges determine accurately their proper alignment and position in relation to the contact bar 10. These strips are heat treated so as to be flexible and permit them to be raised freely at their inner ends by the contact bar and to assume their proper aligned position when the contact bar is lowered. The outer ends of the two sets of contact strips are respectively clamped in position by two metal bars 18. A strip of insulating material 19 covers the bottom and sides of each bar and the bars are held firmly against the support 14 by screws 18a entering from below, the cover plate screws 16a entering the bars from above. As shown in Fig. 3, certain of the strips are spaced from adjoining strips where the screws 18a enter the bars 18.

The strips are provided at their outer ends with upwardly extending pins 17b which engage the outer surfaces of the insulating material 19 for the purpose of insuring proper alignment of the contacts 11 and 11a. Leads 20 are connected to the outer ends of the contact strips respectively and serve as connections to the resistive conductors. These resistive elements may be of any appropriate character and in the present instance are in the form of a series of enameled resistance units of tubular form with the resistive conductor wound thereon. Fig. 1 shows one of these units 21 supported at the back of the casing and is indicated as having taps 21a from the resistive wire at displaced points of connection, the leads therefrom being connected to the contact strips 17 and 17a. Several of these enameled tubular resistance units are utilized in the embodiment shown. As shown in Fig. 3, the strips of the two sets of contacts are opposite each other and as indicated in Fig. 1, the set of contacts 11 are positioned on a slightly higher level than the set of contacts 11a. This difference in elevation of the opposing sets of contacts is for the purpose of insuring a successive engagement of the contacts, first by a contact of one set, then by an opposite contact of the other set, then by the next contact of the first set and so on. Thus the resistive conductors connected between the contacts of each set are successively included or excluded from the controlled circuit. This result is obtained by making the difference in elevation of the two sets of contacts equal to one-half the movement of the contact bar in engaging successive contacts of one set. It is evident that a provision of two opposing sets of contacts permits twice the change of resistance between successive steps than what would be obtained if only one set of contacts were engaged by the contact bar. Instead of placing the contacts of the two sets opposite each other as shown in Figs. 1 and 3 with a slightly different level of the two sets of contacts, the sets of contacts may be placed in staggered relationship as shown in Fig. 4. In that case the opposing sets of contacts would be placed on the same level. The raising or lowering of the contact bar with the staggered relationship would then result in successive engagement or disengagement of first one contact of one set, then a contact of the opposite set, then a contact of the first set and so on.

Fig. 5 shows the connections of the two sets of contact strips to the resistive conductors, the contact strips being indicated in staggered relationship for simplicity. The resistive conductors 22 of the resistive units 21 are shown connected in series with each other, the outer terminals 22a being connected to the controlled circuit. Considering first the right-hand contact strip of the set 17a, this is connected to the left-hand terminal 22a. The right-hand terminal of the set 17 is connected to a tap or a connection between the first two resistive elements. The second contact strip from the right of the set 17a is connected to the next tap and the second contact strip from the right of the set 17 is connected to the next tap and so on. It is apparent that when the contact bar 10 is raised or lowered, it will result in successively including or excluding the resistive conductors between taps or connections thereto, according to the position assumed by the contact bar.

Fig. 6 diagrammatically indicates a modified form of structure. In this case the contact bar 23 is not inclined to a horizontal but the contacts 24 are positioned along a line inclined with reference to the contact bar. These contacts are supported in position by contact strips 25 and the successively engaged contacts are in turn connected to taps from the resistive elements 22. It is evident that when the contact bar 23 is raised or lowered, it will successively short-circuit or include in circuit more or less of the resistive conductors. In Fig. 6 only a single row or set of contacts is indicated for simplicity but a double row may be utilized if desired, connected as in Fig. 5. Instead of the controlled circuit being connected to the outside terminals of the resistive conductors, one terminal of the controlled circuit may be connected to the contact bar and the other terminal to an outer terminal of the resistive conductors. Instead of the contact bar being movable towards and away from the row of contacts, the bar may be fixed and the row of contacts moved towards and away from the bar in some uses.

Fig. 7 shows an application of the invention wherein more than one terminal board head is used. These heads are adapted to be stacked one over the other and mechanically connected together by screws. A separate control bar is provided for each head and the bars are insulated from each other and actuated in common by the armature of the magnet. Fig. 7 shows the plunger rod 5c carrying the two inclined bars 23a and 23b which respectively engage the two rows of movable contacts 24a and 24b carried by the flexible strips 25. The resistive conductors 22 are connected between the strips. The contact bars are spaced so that in one extreme position, the bar 23a engages the left-hand contact 24a; and as the rod 5c moves upwardly it successively engages all the contacts 24a. Then the bar 23b engages the left-hand contact 24b and the continued movement causes successive contacts 24b to be engaged by the bar 23b. In the upper extreme position, all of the contacts 24b will be engaged by the bar 23b, as well as all of the contacts 24a by the bar 23a. The two sets of resistive conductors 22 are connected in series with each other to the controlled circuit as shown.

In Fig. 7 the advantage is obtained of securing greater field current capacity and greater range of control but requires twice the movement of the magnet armature over using a single head of similar form and requires a magnet assembly of somewhat more than twice the power.

Fig. 8 is similar to Fig. 7 except the relationship of the contact bars to the contacts. Here in the lowest extreme position of the parts shown, the two contact bars engage the left-hand contact of each row respectively. Upward movement of the bars gradually short-circuits the resistive conductors of each set simultaneously. The sets of resistive conductors then individually control the circuits to which they are connected. An example of such use is the individual control of the fields of two generators connected in parallel.

More than two terminal board heads may be stacked one above the other and the circuits of the resistors variously connected for adaptation to particular requirements.

Fig. 9 shows the improved rheostat applied to the regulation of the voltage of a dynamo-electric machine which in this particular instance is indicated as a direct current self-excited generator having an armature 26 supplying current to the line 27 of the consumption circuit. The field winding 28 of the generator is shown connected from the negative terminal of the armature 26 through the variable resistance 29 of the rheostat and through a manually controlled rheostat 30 to the positive terminal of the armature. The inclined contact bar 10 is adapted to variably engage the contacts 11 of the rheostat in the manner already described, and also engage contacts 11a, in case a double row of contacts is used. The contact bar is controlled by the electromagnet already described, having a plunger 5, control coil 4 and opposing spring 8. The parts are indicated in the unattracted position of the magnet, at which time the spring causes the contact bar to engage all of the contacts and short-circuit all of the resistance 29 from the field circuit of the generator. The control winding 4 is shown connected from the negative terminal of the generator and through a comparatively high resistance 31 and an adjustable resistance 32 and a switch 33 to the positive terminal of the generator. A capacitor or condenser 34 is connected from the positive terminal of the field winding 28 through the control winding 4 to the negative terminal of the generator. This capacitor being connected in parallel with the field winding of the generator through the winding 4 is subjected to any change in voltage imposed upon the field winding during the controlling action and serves to dampen the movement of the control winding when the magnet responds to any increase or decrease of voltage across the mains 27.

In operation, the voltage of the generator may be manually adjusted by means of the field rheostat 30 but when operating under automatic control, this rheostat may be placed in the resistance-all-out position so as to permit the regulator to have full controlling effect. When passing to automatic control, the switch 33 is closed which subjects the control winding 4 to a current responsive to the voltage of the generator armature. Upon the closing of the switch 33 the controlling magnet will assume an intermediate position and move the contact bar downwardly against the pressure of the spring 8 and thereby insert a proper amount of resistance 29 in the field circuit for bringing the output voltage of the generator to the desired constant value. Adjustment of this value may be made by the rheostat 32. Upon any increase in the generator voltage above the desired normal amount, the controlling magnet will move the contact bar 10 downwardly and thereby weaken the field by inserting more of the resistance 29 in the field circuit. Upon a decrease in the generator voltage below the desired constant value, the current through the winding 4 will be decreased and permit the spring 8 to raise the contact bar to a certain extent and strengthen the field of the generator by short-circuiting more or less of the resistance 29. Although only a few contacts 11 are shown in Fig. 7, it will be understood that a much greater number of variably engaged contacts will be used so as to give refinement of control and the maintaining of the generator voltage within close limits.

The control magnet is made sensitive to small changes in the controlling current and, as already explained, a considerable change of the field resistance results from a comparatively small movement of the plunger or armature of the magnet. The movable parts are of comparatively light weight and being suspended by the leaf springs 6 and 6a, it results that the movable parts quickly respond to any change in voltage of the generator and give a pronounced change of resistance in the field circuit. The quick and pronounced response tends to cause an overcorrection of the departure from normal voltage but this action is rapidly and effectively dampened by the charging or discharging of the condenser 34 which imparts an impulse, or series of impulses, to the control winding 4 in opposition to the change of current therein. For example, upon a decrease of the generator voltage from normal, the decreased current in the control winding 4 permits the contact bar to be raised to pass an increased current through the field winding. This increases the drop in volts through the field winding and as the capacitor 34 is in shunt thereto through the control winding, the charge of the capacitor will be increased correspondingly. This increased charge will then be dissipated through the control winding 4 tending to momentarily increase the current in the winding 4 and thereby counteract to some extent the decrease in current in the field winding 4 which initiated the change. The action is so effective and the anti-hunting response so rapid that the contact bar quickly attains a proper position for maintaining the generator voltage constant. The rapid corrective response and avoidance of hunting similarly occurs upon an increase of the generator voltage above normal. The resulting increase in current in the control winding 4 gives a rapid and pronounced movement of the contact bar downwardly for inserting more resistance in the field circuit and the resulting drop in volts across the field winding lowers the charge of the condenser 34 resulting in an impulse, or series of impulses, from the winding 4 to the condenser tending to increase its charge. This quickly and effectively decreases the increased current in the winding 4 which initiated the action and thereby quickly brings the contact bar to a proper position for maintaining the voltage of the generator constant. The impedance of the winding 4 is comparatively small with reference to that of the field winding which permits change in voltage of the field winding to have a pronounced effect upon the control winding 4 through the action of the condenser.

Fig. 10 shows the improvement applied to the control of an alterating current self-excited dynamo-electric machine or generator for maintaining constant the voltage of lines 36 supplying the consumption circuit. The alternator is indicated as having combined therewith a direct current exciter winding 37 from the positive terminal of which a circuit extends through the manual field rheostat 30 and through the variable resistance 29 and thence through the field winding 38 of the alternator to the negative terminal of the exciter source. The current imposed upon the control winding 4 is derived from the alternating current lines 36 through a rectifier 39 of any suitable form and which is indicated as of the copper oxide bridge type. The positive terminal of the rectifier is connected through the switch 33 and resistances 32 and 31 to the control winding 4, the return from which is connected to the negative terminal of the rectifier. The condenser 34 is connected between the positive terminal of the field winding and the junction between the resistance 31 and the winding 34.

The operation is similar to that described with reference to Fig. 9. Upon the voltage of the mains 36 falling below the desired constant value, the rectifier supplies a decreased current to the control winding. This permits a rapid and pronounced strengthening of current in the field circuit which quickly brings the generator voltage close to normal value. And the action is dampened by reason of the fact that the charge of the condenser is increased by the increase of potential of the intermediate point of the field circuit which in this instance is the positive terminal of the field winding, with the result that the condenser delivers an impulse to the control winding 4 in a direction tending to oppose the decrease in current which initiated the change. Upon the generator voltage rising above normal, the reverse action takes place and the decreased potential of the positive terminal of the field winding lowers the charge of the condenser which results in a current impulse passing from the winding 4 to the condenser which thus tends to counteract the increased current in the winding 4 which initiated the action. In this manner the contact bar 10 is caused to rapidly assume a position which will maintain the voltage of the generator approximately constant under variable conditions, such as any change of load on the consumption circuit.

Instead of using self-excited dynamo-electric machines as disclosed in Figs. 9 and 10, the field winding may be excited from an auxiliary direct current source. Likewise the field may be energized from a separate exciter.

Although preferred embodiments of this invention have been shown and described, it will be understood that various modifications may be made therein without departing from the scope thereof and applied to various purposes according to the particular conditions required.

I claim:

1. Electric controlling apparatus comprising a double row of yieldably movable contacts adjacent to each other in a line in each row, means for supporting the two rows of contacts opposite each other and for supporting one of said rows in a plane parallel to and displaced from the other plane of the said rows, and a contact bar opposite both of said rows of contacts and inclined to said rows of contacts and movable towards and from said rows of contacts for causing the bar to successively engage or disengage alternately a contact of one row and then a contact of the other row and thereby variably engage more or less of said contacts according to the position of said bar.

2. Electric controlling apparatus comprising a double row of yieldably movable contacts adjacent to each other in a line in each row, the two rows being opposite each other and positioned in the same plane and the contacts of one row being in staggered relation to the contacts of the other row, and a contact bar opposite both of said rows of contacts and inclined to said rows of contacts and movable towards and from said rows of contacts for causing the bar to successively engage or disengage alternately a contact of one row and then a contact of the other row and thereby variably engage more or less of said contacts according to the position of said bar.

3. Electric controlling apparatus comprising a plurality of rows of yieldable contacts in different planes, a plurality of contact bars for respectively engaging said rows of contacts, said bars being displaced from each other and inclined to their respective rows of contacts, and a movable element for simultaneously moving said bars towards and from their respective rows for causing the bars to successively engage or disengage a greater or lesser number of their respective contacts, said bars being positioned on said element to successively engage or disengage alternately a contact of one of said rows and then a contact of another of said rows and thereby successively and alternately engage more or less of the contacts of said rows upon movement of said element.

4. Electric controlling apparatus comprising a main supporting frame, a horizontally extending insulating support supported by said frame, a row of flexible strips mounted on the top of said insulating support and having contact end portions extending beyond the edge of said insulating support and positioned thereby in a line adjacent to each other, insulating means for clamping the opposite end portions of said strips to said insulating support at a distance from the contact end portions, a straight contact bar extending adjacent to said contact portions, and a magnet supported by said frame and having a vertically movable plunger positioned opposite the middle portion of said contact bar and directly connected to the middle portion for raising or lowering said bar for variably engaging said row of contact portions, said row of contact portions and said contact bar being relatively inclined to each other.

5. Electric controlling apparatus comprising a main supporting frame, a horizontally extending insulating support supported by said frame, a row of flexible strips mounted on the top of said insulating support and having contact end portions extending beyond the edge of said insulating support and positioned thereby in a line adjacent to each other, insulating means for clamping the opposite end portions of said strips to said insulating support at a distance from the contact end portions, a straight contact bar extending adjacent to said contact portions, a magnet supported by said frame and having a vertically movable plunger positioned opposite the middle portion of said contact bar and directly connected to the middle portion for raising or lowering said bar for variably engaging said row of contact portions, said row of contact portions and said contact bar being relatively inclined to each other, and means for biasing said contact bar to engage all of said contact portions, the variable energization of said magnet causing said contact bar to move away from said contact portions and thereby vary successively the number of contact portions engaged by said contact bar according to the degree of energization of said magnet.

6. Electric controlling apparatus comprising a main supporting frame, a horizontally extending insulating support supported by said frame, a row of flexible strips mounted on the top of said insulating support and having contact end portions extending beyond the edge of said insulating support and positioned thereby in a line adjacent to each other, insulating means for clamping the opposite end portions of said strips to said insulating support at a distance from the contact end portions, a straight contact bar extending adjacent to said contact portions, a magnet supported by said frame and having a vertically movable plunger positioned opposite the middle portion of said contact bar and directly connected to the middle portion for raising or lowering said bar for variably engaging said row of contact portions, said row of contact portions and said contact bar being relatively inclined to each other, and a pair of leaf springs fixed at one end of each of the leaf springs to said frame and secured at the opposite ends respectively above and below said plunger for yieldably supporting and guiding said plunger and contact bar.

FRANK G. LOGAN.

CERTIFICATE OF CORRECTION.

Patent No. 2,338,250. January 4, 1944.

FRANK G. LOGAN.

It is hereby certified that error appears in the printed specification of the above numbered patent requiring correction as follows: Page 4, second column, line 69, claim 1, for "the other plane of the said rows" read --the plane of the other of said rows--; and that the said Letters Patent should be read with this correction therein that the same may conform to the record of the case in the Patent Office.

Signed and sealed this 4th day of April, A. D. 1944.

Leslie Frazer

(Seal) Acting Commissioner of Patents.